UNITED STATES PATENT OFFICE.

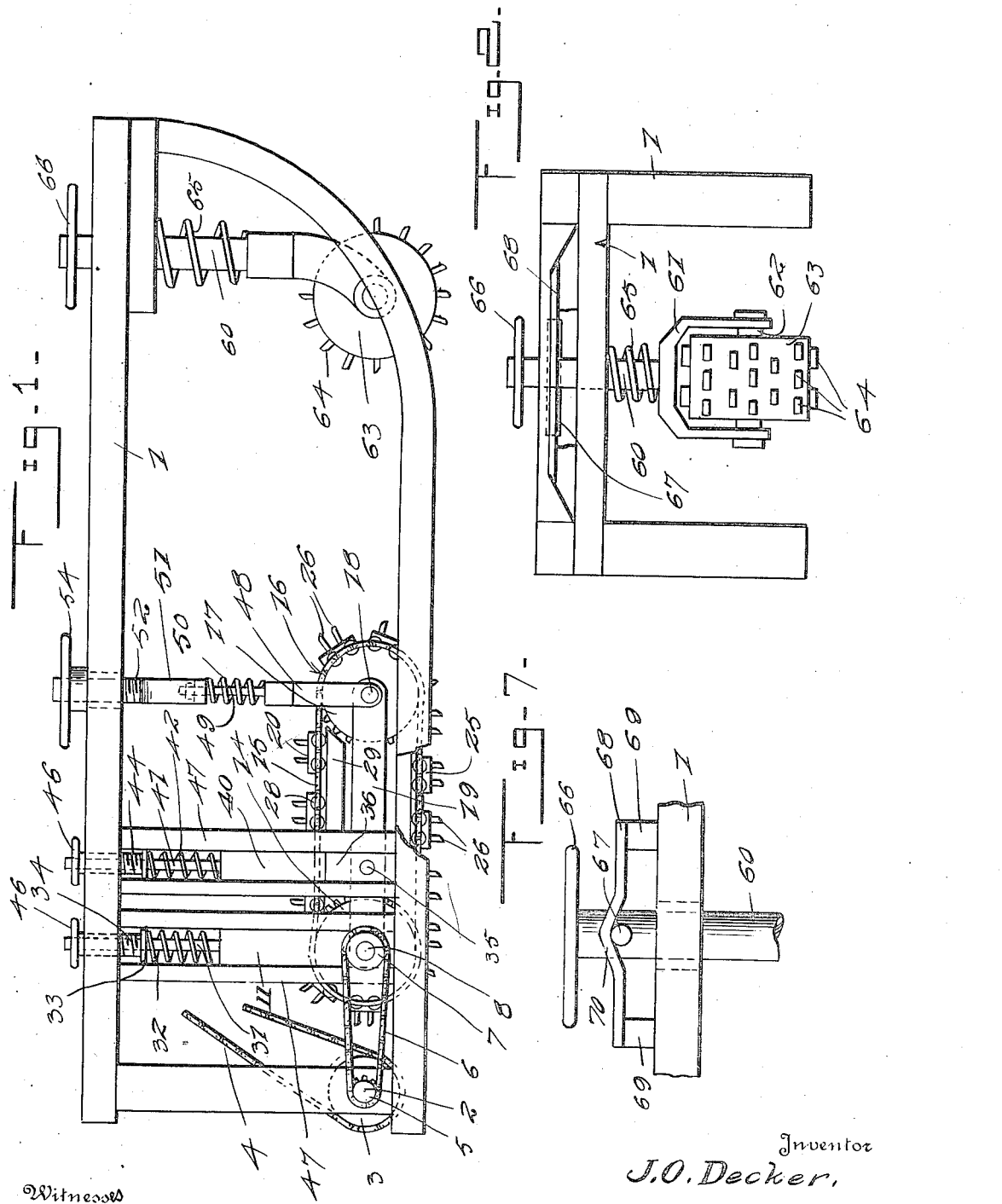

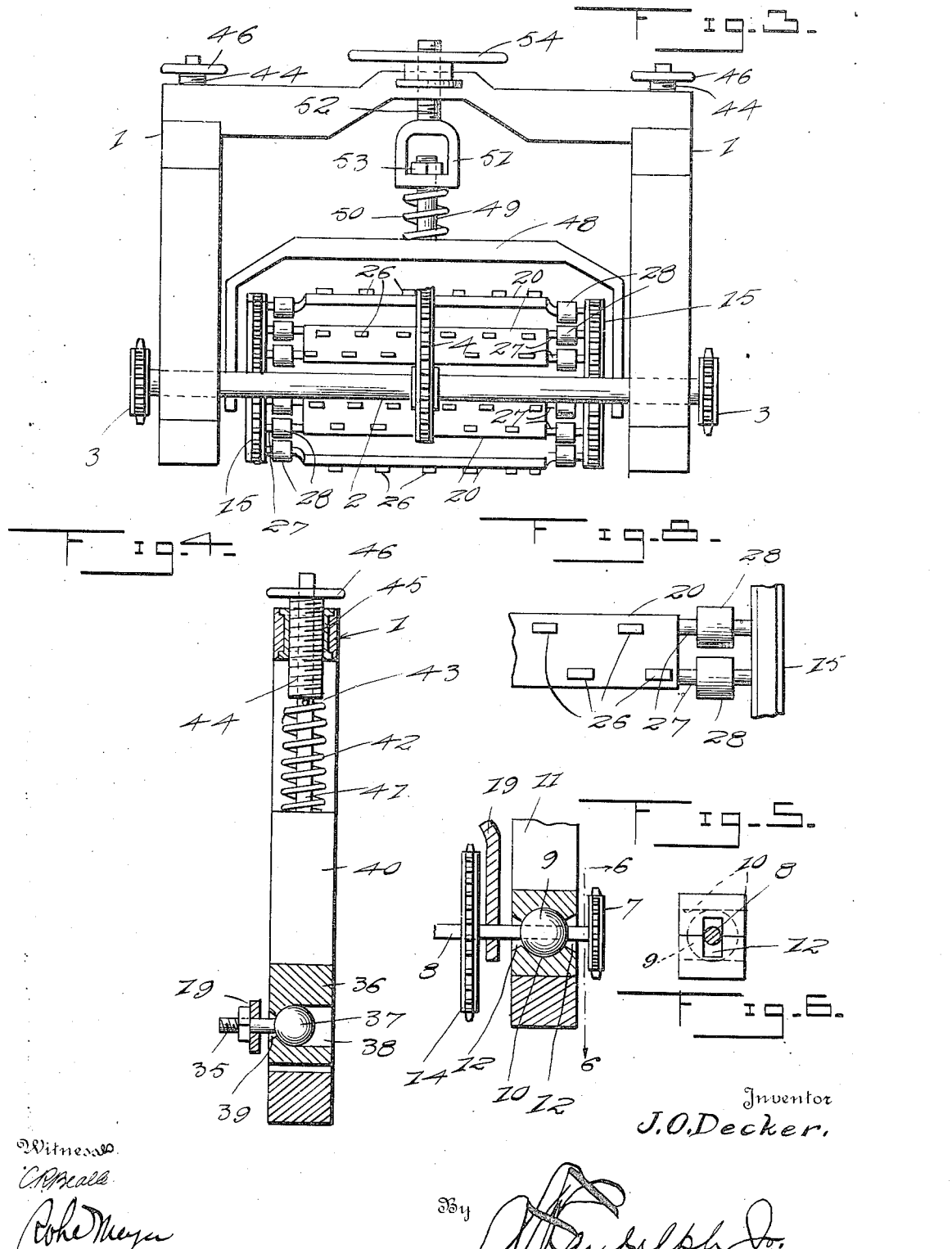

JOHN O. DECKER, OF ORAFINO, NEBRASKA.

MOTOR-SLED.

1,209,404. Specification of Letters Patent. Patented Dec. 19, 1916.

Application filed July 11, 1916. Serial No. 108,616.

*To all whom it may concern:*

Be it known that I, JOHN O. DECKER, a citizen of the United States, residing at Orafino, in the county of Frontier and State of Nebraska, have invented certain new and useful Improvements in Motor-Sleds; and I do hereby declare the following to be a full, clear, and exact description of the invention, such as will enable others skilled in the art to which it appertains to make and use the same.

This invention relates to a motor sled, and the primary object of the invention is to provide a motor sled which is driven through the medium of a caterpillar tread including sprocket chains having a plurality of flights connected thereto to which flights are attached a plurality of snow or ice engaging tines for biting into the snow or ice over which the sled is traveling for assisting in propelling the same, and further to provide rollers which are carried by the ends of the flights and pass over suitable guides for supporting the upper and lower runs of the flights in substantially horizontal planes.

Another object of this invention is to provide means for yieldably connecting the caterpillar tread structure to the main supporting structure of the motor sled whereby the gripping of the tines of the tread portion may be regulated as desired, and whereby the front end of the caterpillar tread may be raised out of a ground engaging position for facilitating the steering of the sled.

A still further object of this invention is to provide a novel structure for steering the motor sled which comprises a vertical rod having a yoke connected to the lower end of the same which rotatably supports a shaft upon which is mounted a spurred wheel, and to provide means for forcing the spurred wheel downwardly into engagement with the surface of the ground over which the sled is passing during the rotary movement of the vertical rod.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved motor sled having parts broken away. Fig. 2 is a front elevation of the front end of the motor sled. Fig. 3 is an elevation of the rear end of the motor sled. Fig. 4 is a vertical section through a part of the motor sled structure. Fig. 5 is a vertical section through one of the bearings for one of the propelling shafts of the caterpillar tread. Fig. 6 is a section on the line 6—6 of Fig. 5. Fig. 7 is a detail side elevation of the mechanism for forcing the front steering wheels downwardly upon rotation of the same. Fig. 8 is a fragmentary plan of one end of one of the flights of the caterpillar tread structure.

Referring more particularly to the drawings, 1 designates the supporting structure of the improved motor sled as an entirety. A shaft 2 is rotatably carried by the rear end of the body 1 of the motor sled and it is adapted for connection with a prime mover of any suitable type, such as an internal combustion engine, through the medium of a sprocket 3 and sprocket chain 4, a sprocket 5 is mounted upon the shaft 2 and a sprocket chain 6 travels about the sprocket 5 and about a sprocket 7 which is mounted upon a shaft 8. The shaft 8 is journaled in balls 9 which are rotatably seated in suitable sockets 10 formed in the vertically movable member 11. Elongated openings 12 communicate with bearing openings 10, and the shaft 8 extends through these openings which are provided for permitting oscillatory movement of the shaft. The shaft 8 has relatively large sprockets 14 mounted thereon, about which the sprocket chains 15 of the caterpillar tread structure travel. The sprocket chains 15 also travel about sprockets 17 which are carried by a shaft 18. The shaft 18 is rotatably supported by a frame 19 through which frame the shaft 8 also extends.

The sprocket chains 15 of the caterpillar tread structure have flights 20 connected thereto in spaced relation to each other which flights have a plurality of staggeredly arranged spurs or tines 26 carried thereby and projecting outwardly from their outer surfaces. The flights 20 are connected to the sprocket chains 15 by means of rods or shafts 27 upon which are rotatably mounted rollers 28. The rollers 28 travel over the edges of guides 29 which hold the upper and lower runs of the sprocket chains 15 in their proper horizontal position.

The vertically slidable member 11 has a bolt 31 connected to its upper end about which a spiral spring 32 is coiled. The lower end of the spiral spring 32 engages the upper surface of the slidable block 11 while the upper end of the spring engages a collar or washer 33 which is mounted upon the bolt 31. The upper end of the bolt 31 is connected to a hollow bolt 34.

The frame 19 is connected through the medium of bolts 35 to a vertically movable block 36. The bolt 35 has a ball 37 formed upon its inner end which is seated in a recess 38 formed in the vertically movable block 36 so as to permit of an oscillatory movement of the bolt independently of the block. The block is further provided with an elongated opening 39 through which the bolt extends which corresponds to the elongated openings 12.

A second vertically movable block 40 is mounted upon the upper surface of the block 36 and it has a bolt 41 attached to its upper surface about which a spring 42 is coiled. The lower end of the spring 42 rests against the upper end of the vertically movable block 40 while the upper end of the spring rests against a washer 43 the upper surface of which abuts the lower end of a hollow bolt 44. The bolt 44 is externally screw threaded and is adjustably seated in a nut 45 which is carried by the upper cross piece of the supporting frame 1. A collar 46 is formed upon the upper end of the bolt 44 for the purpose of rotating the bolt for adjusting its position. The vertically movable blocks 36, 40 and 11 are guided by suitable guiding frames 47 and by the adjustment of the nuts 34 and 44 the height of the rear end or portion of the caterpillar tread structure 16 may be regulated as desired. The bolts or rods 31 and 41 extend slidably through the hollow bolts 44 which permit of a yieldable mounting for the blocks 11, 36 and 40 and consequently for the caterpillar tread structure 16.

The front shaft 18 is rotatably journaled in the end of a yoke 48 to the upper end of the bight portion of which a bolt 49 is connected. The bolt 49 has a spiral spring 50 coiled about the same, the lower surface of which engages the upper surface of the bight portion of the yoke 48 while the upper end of the spring engages the under surface of a yoke 51 which is formed upon the lower end of the bolt 52. The bolt 49 is slidably carried by the lower horizontal cross bar of the yoke or stirrup 51 as clearly shown in Fig. 3 of the drawings, and its downward movement independent of the stirrup is limited by a nut 53 which is mounted upon the upper end of the bolt 49.

A hand wheel 54 is connected to the bolt 52 for rotating the bolt for moving it vertically with respect to the frame 1.

A vertically positioned rod 60 is carried by the front end of the supporting structure 1 for vertical slidable movement and it has a yoke 61 attached to its lower end which yoke supports an axle 62. A wheel 63 is mounted upon the axle 62 and it has a plurality of staggeredly disposed radial spurs 64 attached to the periphery of the same which are provided for biting into the ground. A spring 65 is coiled about the rod 60 and the lower end of the spring engages the top of the yoke 61 while the upper end of the spring engages the under surface of a part of the supporting frame 1. A steering wheel 66 is mounted upon the upper end of the rod 60. A pin 67 extends diametrically through the rod 60 a short distance below the steering wheel 66 and its ends are provided for riding over the under surface of guide bars 68 which are attached to the frame 1 in any suitable manner as indicated at 69. The guide bars 68 are provided with upstruck substantially V-shaped portions 70 in the vertices of which the pins rest under normal conditions.

When it is desired to change the direction of travel of the sleigh, the front end of the caterpillar structure 16 is raised through the medium of the hand wheel 54 and the steering wheel 66 is rotated for turning the wheel 63 in the direction to be taken by the sleigh. When the steering wheel 66 is rotated, it will consequently move the pin 67, and the pin riding downwardly over the inclined sides of the substantially inverted V-shaped portion 70 will force the rod 60 downwardly and consequently force the wheel 63 downwardly causing the spurs 64 to obtain a more firm bite upon the ice or snow over which the sleigh is traveling.

From the foregoing description taken in connection with the accompanying drawings the advantages of construction and of the method of operation of the improved motor sled will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a motor sled structure, the combination with a supporting frame, of an auxiliary frame adjustably carried by said supporting frame for vertical adjustment with respect to the supporting frame, a caterpillar tread structure carried by said auxiliary frame and including sprocket chains, a plurality of flights connected to said sprocket chains, a plurality of spurs attached to said flights and arranged in staggered rows, means for propelling said sprocket chains, a plurality of guide bars carried by said adjustable frame, rollers carried by said caterpillar treads and engaging said guide bars for guiding the travel of the sprocket chains of the caterpillar tread, and means for moving the front end of the caterpillar tread structure vertically independently of vertical movement of the rear end of the caterpillar tread structure.

2. In a motor sled structure, the combination, of a supporting frame, an auxiliary frame, a pair of shafts rotatably carried by said auxiliary frame, balls rotatably carried by said auxiliary frame and provided with diametrically extending bores forming journals for said shafts for permitting movement of one end of the shaft independent of movement of the other end of the shaft, and a caterpillar tread structure carried by said auxiliary frame and operable by the rotation of one of said shafts.

3. In a motor sled structure, a supporting frame, an auxiliary frame adjustably carried by said supporting frame for vertical adjustment with respect thereto, a caterpillar tread structure carried by said auxiliary frame, means for propelling said caterpillar tread, means for adjusting the ends of said auxiliary frame independently of each other, and means for yieldably holding said caterpillar tread in engagement with the ground.

4. In a motor sled structure, a supporting frame, an auxiliary frame adjustably carried by said supporting frame for vertical adjustment with respect to the supporting frame, a caterpillar tread structure carried by said auxiliary frame and including sprocket chains, a plurality of flights connected to said sprocket chains, a plurality of spurs attached to said flights and arranged in staggered rows, means for propelling said sprocket chains, a plurality of guide bars carried by said adjustable frame, rollers carried by said caterpillar treads and engaging said guide bars for guiding the travel of the sprocket chains of the caterpillar tread, means for moving the front end of said caterpillar tread structure vertically independently of the vertical movement of the rear end of the caterpillar structure, and means for yieldably holding said caterpillar tread in engagement with the ground.

5. In a motor sled structure, a supporting frame, an auxiliary supporting frame, vertical guide bars carried by said supporting frame, blocks carried by said auxiliary frame and engaging said guide bars, means connected to said blocks for moving said auxiliary frame vertically independently of said supporting frame, a caterpillar tread carried by said auxiliary frame, coil springs engaging said blocks for yieldably holding said caterpillar tread in engagement with the ground.

6. In a motor sled structure, a supporting frame, an auxiliary supporting frame, carried by said main supporting frame, vertical guide bars carried by said supporting frame, blocks carried by said auxiliary frame and engaging said guide bars, means connected to said blocks for moving said auxiliary frame vertically independently of movement of said supporting frame, a caterpillar tread carried by said auxiliary frame, coil springs engaging said blocks for yieldably holding said caterpillar tread in engagement with the ground, means for regulating the tension of said springs, and means for operating said caterpillar tread.

7. In a motor sled structure, a supporting frame, an auxiliary supporting frame, vertical guide bars carried by said supporting frame, blocks carried by said auxiliary frame and engaging said guide bars, means connected to said blocks for moving said auxiliary frame vertically independently of movement of said supporting frame, a caterpillar tread carried by said auxiliary frame, and means for vertically moving the front end of said auxiliary frame independently of movement of said blocks.

8. In a motor sled structure, a supporting frame, an auxiliary frame, a pair of shafts rotatably carried by said auxiliary frame, balls rotatably carried by said auxiliary frame and provided with diametrically extending bores forming journals for said shafts for permitting movement of one end of the shaft independently of movement of the other end of the shaft, a caterpillar tread structure carried by said auxiliary frame and operable by the rotation of one of said shafts, and means for moving said auxiliary frame vertically independently of said supporting frame.

9. In a motor sled structure, a supporting frame, an auxiliary frame, a pair of shafts rotatably carried by said auxiliary frame, balls rotatably carried by said auxiliary frame and provided with diametrically extending bores forming journals for said shafts for permitting movement of one end of the shaft independently of movement of the other end of the shaft, a caterpillar tread structure carried by said auxiliary frame and operable by the rotation of one of said shafts, and means for moving said auxiliary frame vertically independently of said supporting frame, and means for yieldably holding said caterpillar tread structure in engagement with the ground.

In testimony whereof I affix my signature in presence of two witnesses.

JOHN O. DECKER.

Witnesses:
B. F. BUTLER,
MAUDLEE L. BUTLER.